United States Patent
Fjare et al.

(10) Patent No.: US 8,487,011 B2
(45) Date of Patent: Jul. 16, 2013

(54) SULFIDED FISCHER-TROPSCH CATALYST

(75) Inventors: Douglas E. Fjare, Bartlesville, OK (US); Joe D. Allison, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 305 days.

(21) Appl. No.: 12/951,580

(22) Filed: Nov. 22, 2010

(65) Prior Publication Data

US 2011/0124751 A1 May 26, 2011

Related U.S. Application Data

(60) Provisional application No. 61/263,901, filed on Nov. 24, 2009.

(51) Int. Cl.
*C07C 27/00* (2006.01)

(52) U.S. Cl.
USPC .......................................... 518/715; 518/700

(58) Field of Classification Search
USPC .................................................. 518/700, 715
See application file for complete search history.

(56) References Cited

U.S. PATENT DOCUMENTS

| | | |
|---|---|---|
| 3,661,798 A | 5/1972 | Cosyns et al. |
| 5,135,958 A | 8/1992 | Radlowski et al. |
| 6,605,647 B2 | 8/2003 | Yamada et al. |
| 2001/0006984 A1 | 7/2001 | Lapidus et al. |
| 2002/0183403 A1 | 12/2002 | Huang et al. |

OTHER PUBLICATIONS

Madikizela-Mnqanqeni et al., "The Effect of Sulfur Addition During the Preparation of Co/Zn/TiO2 Fischer-Tropsch Catalysts," Applied Catalysis A: General vol. 340, Issue 1, 2008, pp. 7-15.

Visconti, "Fischer-Tropsch Synthesis on Sulphur Poisoned Co/Al2O3 Catalyst," Applied Catalysis A: General, vol. 330, 2007, pp. 49-56.

*Primary Examiner* — Jafar Parsa

(74) *Attorney, Agent, or Firm* — Phillips 66 Company

(57) ABSTRACT

Methods and compositions relate to a Fischer-Tropsch catalyst utilized to convert syngas into paraffins. The catalyst includes a given amount of sulfur content from contact of a catalytic supported metal with sulfur. Subsequent activation of the catalyst prepares the catalyst to be used for conversion of the syngas. The sulfur content maintained in the catalyst after being activated influences selectivity to paraffins over olefins and oxygenates.

17 Claims, 1 Drawing Sheet

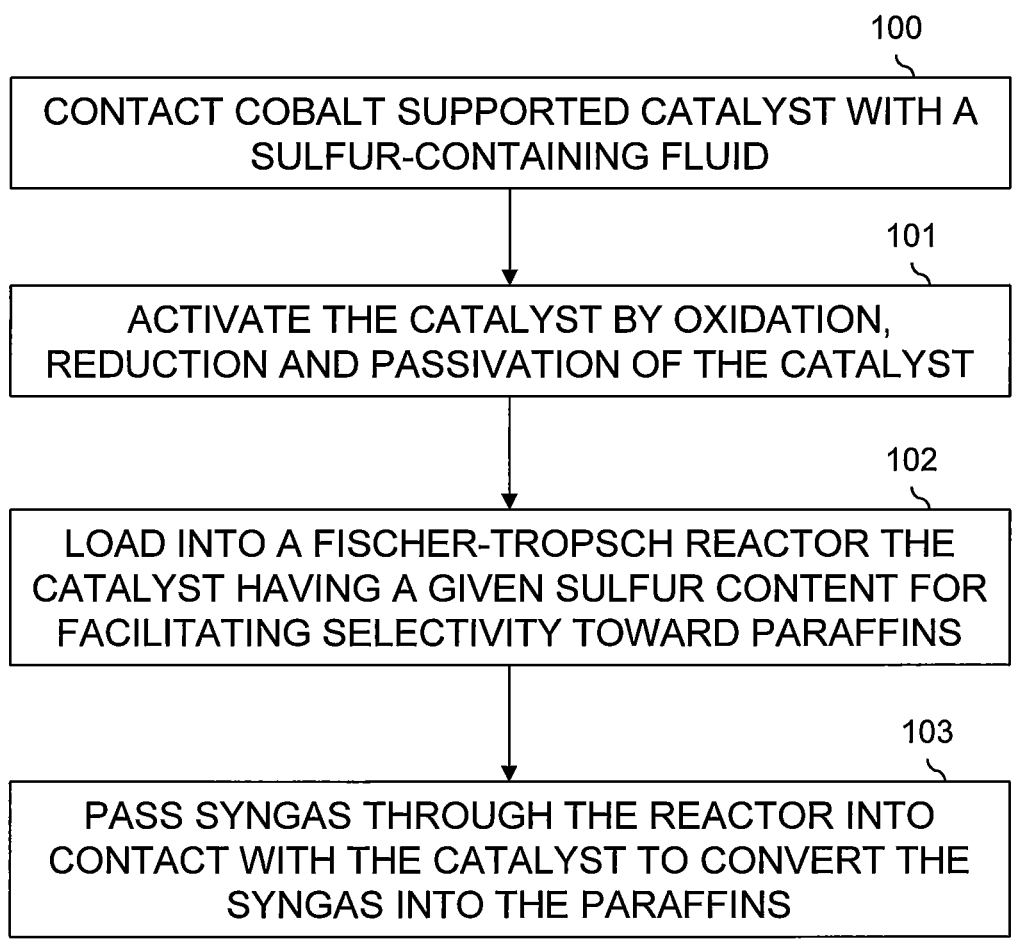

SULFIDED FISCHER-TROPSCH CATALYST

CROSS-REFERENCE TO RELATED APPLICATIONS

This application is a non-provisional application which claims benefit under 35 USC §119(e) to U.S. Provisional Application Ser. No. 61/263,901 filed Nov. 24, 2009, entitled "SULFIDED FISCHER-TROPSCH CATALYST," which is incorporated herein in its entirety.

STATEMENT REGARDING FEDERALLY SPONSORED RESEARCH OR DEVELOPMENT

None

FIELD OF THE INVENTION

Embodiments of the invention relate to compositions for catalysts and methods of synthesizing and using the catalysts that are suitable to convert syngas into paraffins

BACKGROUND OF THE INVENTION

Reforming of carbon resources, such as methane in natural gas, coal, petcoke, and biomass, can produce synthesis gas or syngas that is a mixture of hydrogen and carbon monoxide. Catalytic reactions during Fischer-Tropsch (FT) synthesis then convert the syngas into paraffinic hydrocarbons. Hydroprocessing of the paraffinic hydrocarbons produces useful liquid fuels, such as diesel.

Conversion of the syngas into the paraffinic hydrocarbons may utilize various prior FT catalysts. Examples of the catalyst include a Group VIII metal, such as cobalt, on a suitable support. Sulfur can poison such cobalt-based catalysts causing undesirable loss in activity. Preventing sulfur contamination in past approaches ensures the catalyst does not require premature reclaiming by removal of the sulfur from the catalyst upon the activity being diminished below an acceptable level by sulfur poisoning.

The catalysts used can also result in producing byproducts including olefins and oxygenates during reaction of the syngas. Prior to hydrocracking to lower chain paraffins, the byproducts require additional expensive and hydrogen consuming processing into corresponding paraffins Hydrotreating expenses thus depend on selectivity of the FT catalysts to produce the paraffins since hydrotreating costs increase as the selectivity decreases. Furthermore, a ratio of olefins and oxygenates to paraffins produced tends to vary over a run duration of the catalyst necessitating changes and inefficient operation of the hydroprocessing over time.

Therefore, a need exists for improved compositions for catalysts and methods of synthesizing and using the catalysts to convert syngas into paraffins.

SUMMARY OF THE INVENTION

In one embodiment, a method of synthesizing paraffins includes activating a Fischer-Tropsch catalyst formed from cobalt on a support as majority constituents and with between 0.05 weight percent and 1.0 weight percent sulfur retained following the activating. The activating increases activity of the catalyst for syngas to paraffin conversion. The method further includes converting syngas into the paraffins by passing the syngas into contact with the catalyst after the activating of the catalyst.

According to one embodiment, a composition for paraffin synthesis includes cobalt disposed on alumina. In addition, the composition includes sulfur reacted with particles of the alumina and the cobalt. The cobalt, the alumina and the sulfur define a Fischer-Tropsch catalyst with at least 95% selectivity to paraffins and carbon monoxide conversion activity of at least 25% achievable under conditions defined by a 222° C. reactor temperature and 2413 kilopascal reactor pressure with a weight hourly space velocity of 3.4 $hr^{-1}$ and feed gas flow of 58% hydrogen, 32% carbon monoxide and 10% inert content.

For one embodiment, a method of synthesizing paraffins includes contacting cobalt disposed on alumina with a sulfur-containing fluid to provide sulfur loaded particles. Oxidizing and then reducing the sulfur loaded particles thereby provides a catalyst. The method also includes converting syngas passed into contact with the catalyst given that the oxidizing and the reducing provides the catalyst used in the converting with at least 95% selectivity to paraffins and carbon monoxide conversion activity of at least 25% achievable under conditions defined by a 222° C. reactor temperature and 2413 kilopascal reactor pressure with a weight hourly space velocity of 3.4 $hr^{-1}$ and feed gas flow of 58% hydrogen, 32% carbon monoxide and 10% inert content.

BRIEF DESCRIPTION OF THE DRAWINGS

The invention, together with further advantages thereof, may best be understood by reference to the following description taken in conjunction with the accompanying drawings.

FIG. 1 is a flow chart illustrating a method of preparing and using a Fischer-Tropsch catalyst, according to one embodiment of the invention.

DETAILED DESCRIPTION OF THE INVENTION

Embodiments of the invention relate to a Fischer-Tropsch catalyst utilized to convert syngas into paraffins. The catalyst includes a given amount of sulfur content from contact of a catalytic supported metal with sulfur, which may be provided as hydrogen sulfide, disulfides (e.g., dimethyl disulfide (DMDS)), carbonyl sulfide, carbon disulfide, thiols, thioethers, thioesters, thioacetals, polysulfides, and thiophenes. Subsequent activation of the catalyst prepares the catalyst to be used for conversion of the syngas. The sulfur content maintained in the catalyst after being activated influences selectivity to paraffins over olefins and oxygenates.

In one embodiment, the catalyst includes at least one Group VIII metal disposed on a suitable support, such as alumina, titania or silica and mixtures thereof. For example, the catalyst may include cobalt on alumina as majority constituents of the catalyst. When cobalt is utilized as catalytic metal, the catalyst may include cobalt in an amount totaling from about 1% to about 50%, from about 5% to about 40%, or from about 15% to about 35% by weight of total catalyst composition (e.g., catalytic metal, support, and any optional promoters).

In addition to the cobalt and the alumina, the catalyst may include one or more promoter metals, such as ruthenium, platinum, rhenium, palladium, boron, silver, and combinations thereof, which may for example form less than one weight percent of the catalyst. In one embodiment, the promoter comprises between about 0.001 and about 10 weight percent of the total catalyst weight. Suitable measures of performance that may be enhanced by the promoter include selectivity, reactant conversion, hydrocarbon productivity, product yield, activity, stability, reducibility and regenerability. The promoter may be an element that also, in an active form, has catalytic activity in absence of the catalytic metal. As used herein, the term promoter refers to such an element when present in the catalyst in a lesser weight percent than the catalytic metal.

The promoter may be present in the catalyst in an amount between about 0.00001% and about 10% rhenium by weight of the total catalyst composition. The promoter may be present in an amount to provide a weight ratio of elemental promoter:elemental catalytic metal of from about 0.00005:1 to about 0.5:1 or from about 0.0005:1 to about 0.25:1 (dry basis). The promoter may be in elemental form. When the promoter comprises a metal from Groups VII-X, such as rhenium, ruthenium, platinum, or palladium, the weight ratio of elemental promoter:elemental catalytic metal may be between about 0.00005:1 and about 0.05:1. In one embodiment, the promoter is present in an oxide compound. Further, the promoter may be present in an alloy containing the catalytic metal.

The catalyst further includes sulfur that in some embodiments is at least about 0.05 weight percent and less than about 1.0 weight percent of the catalyst or between 0.1 weight percent and 0.3 weight percent of the catalyst. The catalyst in some embodiments consists essentially of the cobalt, the alumina and the sulfur. In an exemplary sulfiding procedure, an initial composite of the metal and the support is subjected to sulfiding conditions sufficient to provide a desired sulfur concentration. Contacting the initial composite with a vaporous sulfur-containing compound may deposit the sulfur upon the catalyst.

For some embodiments, such contacting may occur during use of the initial composition for syngas conversion when the syngas has enough sulfur content to achieve desired loading. Since sulfur contamination in the syngas has been known to result in catalyst poisoning, removal of the sulfur from the syngas in prior approaches to convert the syngas ensures sulfur loading avoidance. Spent catalyst material due to deactivation thus may form the initial composition. If sulfur is introduced independent from use for syngas conversion, the sulfur-containing compound may pass in contact with the initial composition as a gas stream, which is reactive to incorporate the sulfur but otherwise nonreactive with the initial composition.

Examples of the sulfur-containing compound include hydrogen sulfide, disulfides (e.g., dimethyl disulfide (DMDS)), carbonyl sulfide, carbon disulfide, thiols, thioethers, thioesters, thioacetals, polysulfides, and thiophenes. The sulfiding conditions may include a temperature sufficient to maintain the sulfur-containing compound present as a vapor, such as temperatures ranging from about 10° C. to about 500° C., or from about 20° C. to about 400° C. when hydrogen sulfide is utilized as the sulfiding agent. Pressure employed during the sulfiding procedure may range from about 100 to about 5000 kilopascal (kPa) or higher. Duration of the sulfiding procedure depends on factors such as the sulfur-containing compound, concentration of the sulfur-containing compound, the temperature, and amount of the sulfur to be incorporated into the catalyst. The sulfiding procedure when done independent of syngas conversion may occur over a period of at least about 10 minutes or about 10 minutes to about 24 hours.

Following the sulfiding procedure, activation of the catalysts increases activity of the catalyst for syngas to paraffin conversion. In some embodiments, the activation includes oxidizing and then reducing the catalyst prior to an oxidative passivation treatment of the catalyst. While not limited to any theory, oxidation tends to increase a valence state of the metal (e.g., Co to $Co^{2+}$) that is disposed on the support. An oxidant such as oxygen-containing gas or air, water or steam contacts the catalyst during the oxidizing. The reducing of the catalyst may include contacting the catalyst with hydrogen gas under reduction conditions. For some embodiments, the activation of the catalyst includes heating the catalyst to above about 300° C. for the oxidizing and/or the reducing. Further, the oxidative passivation treatment may include contacting the catalyst with another oxygen containing stream below about 300° C.

In some embodiments, the activation includes dewaxing of the catalyst by extraction with a hydrocarbon solvent, such as diesel or toluene. Such washing of the catalyst removes wax and carbonaceous buildup on the catalyst, which may result from use for syngas conversion. The dewaxing preconditions the catalyst for the oxidizing and the reducing that occur subsequent.

In use, operation of a reactor loaded with the catalyst converts syngas feed from a syngas generation source into paraffins output from the reactor. The syngas includes a mixture of carbon monoxide and hydrogen or a hydrogen source. Molar ratio of hydrogen to carbon monoxide in the feed may be greater than 0.5:1.0 (e.g., between 1.5:1.0 and 3.0:1.0 or between 2.0:1.0 and 2.2:1.0). The feed gas may also contain inert constituents up to about 50 weight percent or from 0 weight percent to 10 weight percent. Examples of the syngas generation source include an autothermal reformer, steam methane reformer or a solid fuel gasification unit. As shown in Example 1 herein, the catalyst provides at least 95% selectivity to paraffins. Products thus contain less than 5% of oxygenates and olefins.

This Fischer-Tropsch process in some embodiments is run in a continuous mode. The weight hourly space velocity through a reaction zone may range from about 1 $hr^{-1}$ to about 10 $hr^{-1}$ or from about 3 $hr^{-1}$ to about 4 $hr^{-1}$. The weight hourly space velocity is defined as the weight of reactants per time per catalyst weight. A reaction zone volume is defined by the portion of the reactor volume where the reaction takes place and which is occupied by a gaseous phase comprising reactants, products and/or inerts; a liquid phase comprising liquid/wax products and/or other liquids; and a solid phase comprising catalyst. The reaction zone temperature may range from about 160° C. to about 300° C., from about 190° C. to about 260° C., or from about 205° C. to about 230° C. The reaction zone pressure may range from about 80 pounds per square inch absolute (psia) (552 kPa) to about 1,000 psia (6,895 kPa), from about 80 psia (552 kPa) to about 800 psia (5,515 kPa), from about 140 psia (965 kPa) to about 750 psia (5,170 kPa), or from about 300 psia (2,068 kPa) to about 400 psia (2,758 kPa).

FIG. 1 illustrates an exemplary method of preparing and using a Fischer-Tropsch catalyst based on aspects described herein. In a sulfiding step 100, a sulfur-containing fluid contacts cobalt supported catalyst particles. Next, oxidation, reduction and passivation of the catalyst occur in activation step 101. Reactor loading step 102 includes filling a Fischer-Tropsch reactor with the catalyst that has a given sulfur content after the activation step 101 for facilitating selectivity toward paraffins. Passing syngas through the reactor in synthesis step 103 contacts the syngas with the catalyst for conversion of the syngas into the paraffins.

EXAMPLE 1

A catalyst made of alumina ($Al_2O_3$) supported cobalt (Co) having been sulfided to contain 0.13 weight percent (wt. %) sulfur was oxidized in a nitrogen and air mixture containing 2% oxygen for 8 hours at 300° C. After purging with nitrogen to remove the oxygen, the catalyst was reduced in a flow of hydrogen gas for 8 hours at 325° C. The catalyst was then cooled to 20° C. with the hydrogen removed by again purging with nitrogen. A nitrogen and air mixture containing 1% oxygen was then passed in contact with the catalyst for 3 hours to passivate the catalyst. The sulfur content of the catalyst following this passivation was measured to be 0.11 wt. %.

A slurry bubble column reactor was charged with 6.99 kilograms (kg) of the catalyst collected following the passivation. The reactor was fed with 24.04 kg per hour of syngas (weight hourly space velocity of 3.4 $hr^{-1}$) having a $H_2/CO$ ratio of 1.8 and 10% inert content (i.e., 58% hydrogen and 32% carbon monoxide) at a pressure of 2413 kilopascal and temperature of 222° C. The syngas feed contained less than 5 parts per billion sulfur contamination.

The reactor was operated for 35 days with results shown in Table 1. Further, carbon monoxide conversion activity was greater than 25%. Over 80% of the conversion activity that was lost as a result of the catalyst having been sulfided was thereby recovered by subsequent activation including the oxidation and reduction as described herein.

TABLE 1

| | Weight Percent n-Paraffin in Product | | | |
|---|---|---|---|---|
| | $C_5$-$C_{12}$ | $C_8$-$C_{24}$ | $C_{18+}$ | Total |
| Beginning of run | 91% | 97% | 99% | 97% |
| End of run | 92% | 95% | 98% | 96% |

COMPARATIVE EXAMPLE 2

A catalyst made of alumina supported cobalt without having been sulfided was used for conversion of syngas. Conversion of the syngas continued for 49 days from start of run until stopped for catalyst treatment. The catalyst treatment included dewaxing of the catalyst by extraction with toluene followed by oxidation, reduction and passivation according to procedures described in Example 1. Results shown in Table 2 demonstrate product distribution changes over time and influence of the oxidation, reduction and passivation on product selectivity.

TABLE 2

| | Weight Percent n-Paraffin in Product | | | |
|---|---|---|---|---|
| | $C_5$-$C_{12}$ | $C_8$-$C_{24}$ | $C_{18+}$ | Total |
| Beginning of run | 63% | 78% | 97% | 83% |
| Before catalyst treatment | 72% | 87% | 99% | 89% |
| After catalyst treatment | 73% | 87% | 98% | 87% |

At the start of the run, non-paraffin compounds made up 17% of the products compared to only 11% of the products at the end of 49 days. Lowering both the paraffin content and changes in paraffin content over time as provided by Example 1 relative to Example 2 reduces hydrotreating capacity needed to handle the non-paraffin compounds. Furthermore, lack of improvement in the results of Table 2 after the catalyst treatment illustrates that the catalyst treatment alone fails to provide selectivity as demonstrated in Example 1.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A method, comprising:
    activating a Fischer-Tropsch catalyst formed from cobalt on a support with between 0.05 weight percent and 1.0 weight percent sulfur retained following the activating, wherein the activating increases activity of the catalyst for syngas to paraffin conversion and wherein the activating of the catalyst includes sequential oxidation, reduction and passivation of the catalyst; and
    converting syngas into paraffins by passing the syngas into contact with the catalyst after the activating of the catalyst.

2. The method according to claim 1, wherein the catalyst contains at least 0.1 weight percent and less than 0.3 weight percent sulfur retained following the activating.

3. The method according to claim 1, further comprising incorporating the sulfur with the cobalt disposed on the support by contacting the cobalt disposed on the support with a gas that includes a sulfur compound and is otherwise nonreactive with the cobalt disposed on the support.

4. The method according to claim 1, further comprising incorporating the sulfur with the cobalt disposed on the support by contacting the cobalt disposed on the support with a gas that includes at least one of hydrogen sulfide and dimethyl disulfide and is otherwise nonreactive with the cobalt disposed on the support.

5. The method according to claim 1, wherein the converting provides at least 95% selectivity to paraffins.

6. The method according to claim 1, wherein the support comprises at least one of alumina, titania, and silica.

7. The method according to claim 1, wherein the catalyst contains the cobalt in an amount between 15 weight percent and 35 weight percent and contains less than 1 weight percent of at least one promoter metal.

8. The method according to claim 1, wherein the catalyst consists essentially of the cobalt, the sulfur and the support made of alumina.

9. The method according to claim 1, wherein the activating of the catalyst includes heating the catalyst to above 300° C.

10. The method according to claim 1, wherein the activating of the catalyst includes oxidizing and then reducing the catalyst.

11. The method according to claim 1, wherein the activating of the catalyst includes washing the catalyst with a solvent followed by sequential oxidation, reduction and oxidative passivation of the catalyst.

12. The method according to claim 1, wherein the activating of the catalyst comprises oxidizing the catalyst with an oxidation stream containing 2% oxygen, reducing the catalyst in a reduction stream of hydrogen, and passivating the catalyst in a passivation stream containing 1% oxygen.

13. The method according to claim 1, wherein the activating results in the catalyst used in the converting having carbon monoxide conversion activity of at least 25% achievable under conditions defined by a 222° C. reactor temperature and 2413 kilopascal reactor pressure with a weight hourly space velocity of 3.4 $hr^{-1}$ and feed gas flow of 58% hydrogen, 32% carbon monoxide and 10% inert content.

14. The method according to claim 1, wherein the converting produces products with less than 5% oxygenates and olefins and the activating results in the catalyst used in the converting and carbon monoxide conversion having activity of at least 25% achievable under conditions defined by a 222° C. reactor temperature and 2413 kilopascal reactor pressure with a weight hourly space velocity of 3.4 hr$^{-1}$ and feed gas flow of 58% hydrogen, 32% carbon monoxide and 10% inert content.

15. A method, comprising:
contacting cobalt disposed on alumina with a sulfur-containing fluid to provide sulfur loaded particles;
oxidizing and then reducing the sulfur loaded particles, which thereby provide a catalyst; and
converting syngas passed into contact with the catalyst, wherein the oxidizing and the reducing provides the catalyst used in the converting with at least 95% selectivity to paraffins and carbon monoxide conversion activity of at least 25% achievable under conditions defined by a 222° C. reactor temperature and 2413 kilopascal reactor pressure with a weight hourly space velocity of 3.4 hr$^{-1}$ and feed gas flow of 58% hydrogen, 32% carbon monoxide and 10% inert content.

16. The method according to claim 15, wherein the catalyst retains between 0.05 weight percent and 1.0 weight percent sulfur following the activating.

17. The method according to claim 15, wherein the sulfur-containing fluid includes at least one of hydrogen sulfide and dimethyl disulfide and is otherwise nonreactive with the cobalt and the support.

\* \* \* \* \*